(12) United States Patent
Kolhouse et al.

(10) Patent No.: US 9,410,490 B2
(45) Date of Patent: Aug. 9, 2016

(54) FUEL SELECTION SYSTEM AND METHOD FOR DUAL FUEL ENGINES

(71) Applicant: Cummins Inc., Columbus, IN (US)

(72) Inventors: J. Steven Kolhouse, Columbus, IN (US); Timothy P. Lutz, Columbus, IN (US); C. Larry Bruner, Greenwood, IN (US)

(73) Assignee: Cummins, Inc., Columbus, IN (US)

( * ) Notice: Subject to any disclaimer, the term of this patent is extended or adjusted under 35 U.S.C. 154(b) by 156 days.

(21) Appl. No.: 14/174,319

(22) Filed: Feb. 6, 2014

(65) Prior Publication Data

US 2015/0219023 A1 Aug. 6, 2015

(51) Int. Cl.
*F01N 3/00* (2006.01)
*F02D 19/06* (2006.01)
*F02D 41/04* (2006.01)

(52) U.S. Cl.
CPC .............. *F02D 19/0642* (2013.01); *Y02T 10/32* (2013.01); *Y02T 10/36* (2013.01)

(58) Field of Classification Search
CPC ...... F02D 19/0642; F02D 19/105; F02B 7/06
USPC .......................... 123/27 GE, 525, 526; 60/285
See application file for complete search history.

(56) References Cited

U.S. PATENT DOCUMENTS

| 4,416,244 | A | 11/1983 | McDonald |
| 4,619,240 | A | 10/1986 | Bedford et al. |
| 4,955,326 | A | 9/1990 | Helmich |
| 6,073,592 | A | 6/2000 | Brown et al. |
| 6,101,986 | A | 8/2000 | Brown et al. |
| 7,325,529 | B2 | 2/2008 | Ancimer et al. |
| 2009/0070008 | A1 * | 3/2009 | Batenburg ............ F02D 19/027 701/103 |
| 2009/0292444 | A1 | 11/2009 | Russell |

FOREIGN PATENT DOCUMENTS

| DE | 102005021491 | 11/2006 |
| EP | 1570163 B1 | 8/2006 |
| FR | 2870294 | 11/2005 |
| JP | 2008267324 | 11/2008 |
| JP | 2010030458 | 2/2010 |
| WO | 2007137642 | 12/2007 |

OTHER PUBLICATIONS

United Kingdom Search Report, GB1501503.5 Cummins Inc., dated Aug. 28, 2015, 2 pgs.

\* cited by examiner

*Primary Examiner* — Audrey K Bradley
*Assistant Examiner* — Anthony Ayala Delgado
(74) *Attorney, Agent, or Firm* — Taft Stettinius & Hollister LLP

(57) ABSTRACT

Systems and methods for controlling operation of dual fuel internal combustion engines are disclosed. The control techniques provide for override of a dual fuel mode of operation of the engine by selection of a diesel only fuelling mode in response to one or more operating conditions of the internal combustion engine.

18 Claims, 4 Drawing Sheets

FUEL SELECTION SYSTEM AND METHOD FOR DUAL FUEL ENGINES

FIELD OF THE INVENTION

The present invention relates generally to dual fuel internal combustion engines, and more particularly is concerned with systems and methods for selecting fuel for operation of a dual fuel internal combustion engine.

BACKGROUND

A dual fuel engine is an engine that includes a first fuel source that is utilized as the sole fuel source during certain operating conditions and a second fuel source that is integrated with the first fuel source at other operating conditions. In certain applications, the first fuel source is a diesel fuel and the second fuel source is natural gas. The diesel fuel provides, in some cases, the initial, low load levels of operation and is used for ignition for the natural gas at higher load operations. The substitution of natural gas for diesel fuel improves high load performance and emissions reduction, particularly when the engine is employed at locations where natural gas is abundant or available at low cost.

When the engine is operating in dual fuel mode, natural gas is introduced into the intake system. The air-to-natural gas mixture from the intake is drawn into the cylinder, just as it would be in a spark-ignited engine, but typically with a leaner air-to-fuel ratio. Near the end of the compression stroke, diesel fuel is injected, just as it would be in a traditional diesel engine. The diesel fuel ignites, and the diesel combustion causes the natural gas to burn. The dual fuel engine combusts a mixture of air and fuel in the cylinders to produce drive torque. A dual fuel engine can operate either entirely on diesel fuel or on the substitution mixture of diesel and natural gas, but generally cannot operate on natural gas alone except where auxiliary spark equipment is provided to the cylinder.

Dual fuel engines may encounter conditions during operation where fuelling in a dual fuel mode provides operating conditions that are not desirable. Such conditions may relate to, for example, the availability or quality of the natural gas, the operating parameters of the engine, and the operating parameters of the exhaust aftertreatment system. Thus, there remains a need for additional improvements in systems and methods for dual fuel engine operation and control.

SUMMARY

Unique systems, apparatus and methods are disclosed for fuel selection in operation of dual fuel engines. In one embodiment, a diesel only fuelling mode of operation of the engine occurs in response to a selection by an operator or service technician of the diesel only fuelling mode. In other embodiments, selection of the diesel only fuelling mode is made automatically and/or in response to at least one of a gaseous fuel supply deficiency indication, a gaseous fuel quality deficiency indication, an engine protection limit violation, and/or an aftertreatment component management requirement.

In some embodiments, the gaseous fuel supply deficiency indication is provided in response to at least one of a gaseous fuel supply pressure being less than a lower threshold amount, the gaseous fuel flow rate being less than a commanded gaseous fuel flow rate by more than a threshold amount, and the diesel fuelling substitution rate exceeding an upper threshold amount in response to a torque request of the engine that is fuelled at a commanded natural gas flow rate expected to satisfy the torque request. In other embodiments, the gaseous fuel quality deficiency indication is provided in response to a quality of the gaseous fuel being less than a gaseous fuel quality threshold. In yet other embodiments, the engine protection limit violation is provided in response to a high temperature limit of one or more fuel injectors being exceeded, an engine knock amount exceeding a knock limit, and/or an intake manifold pressure exceeding an upper pressure limit due to, for example, a backfire condition, a high pressure condition of the gaseous fuel supply, a failure of a gaseous fuel supply control valve, and/or failure of the gaseous fuel supply control system. In another embodiment, the aftertreatment component management requirement is provided in response to an indication of deposits of, for example, urea, sulfur, particulates and/or soot on one or more components of the aftertreatment system exceeding an accumulation limit.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
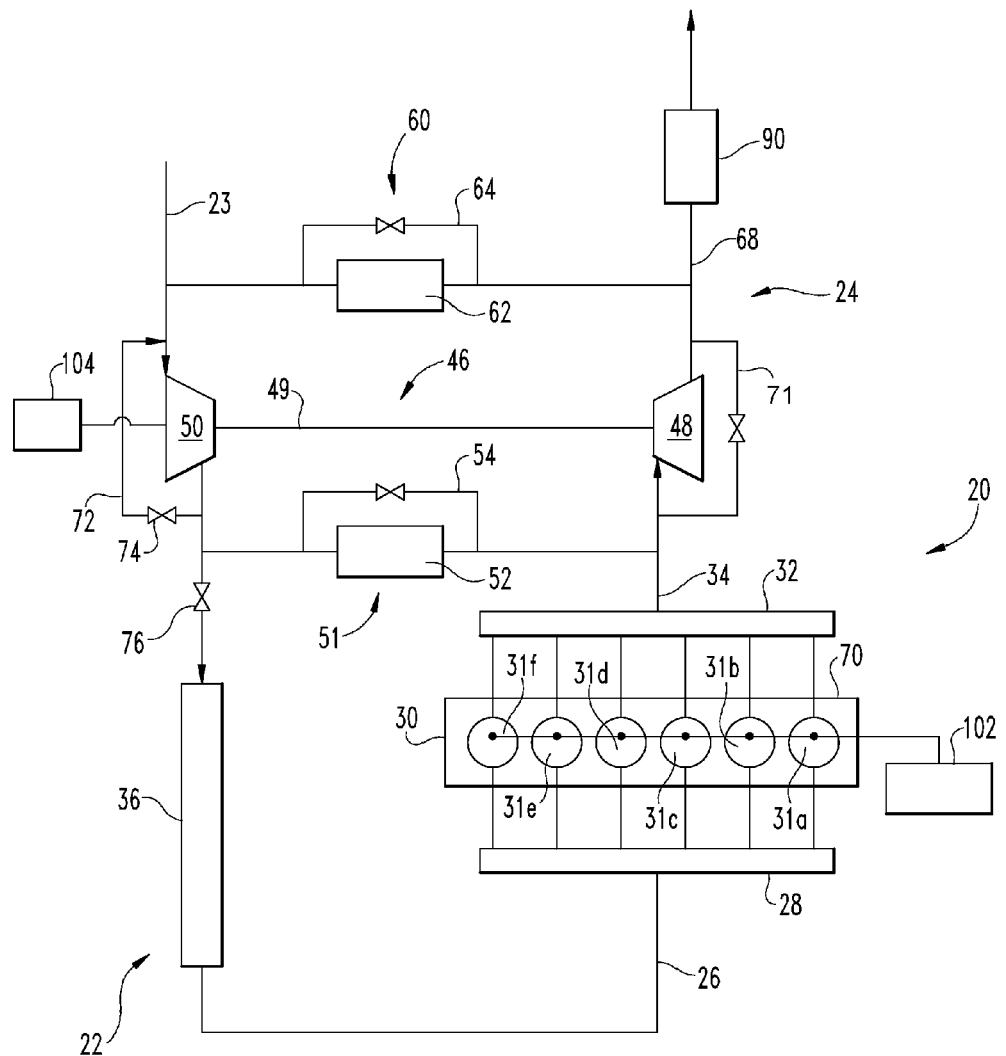
FIG. 1 is a schematic illustration of a portion of an internal combustion engine system with a dual fuel system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
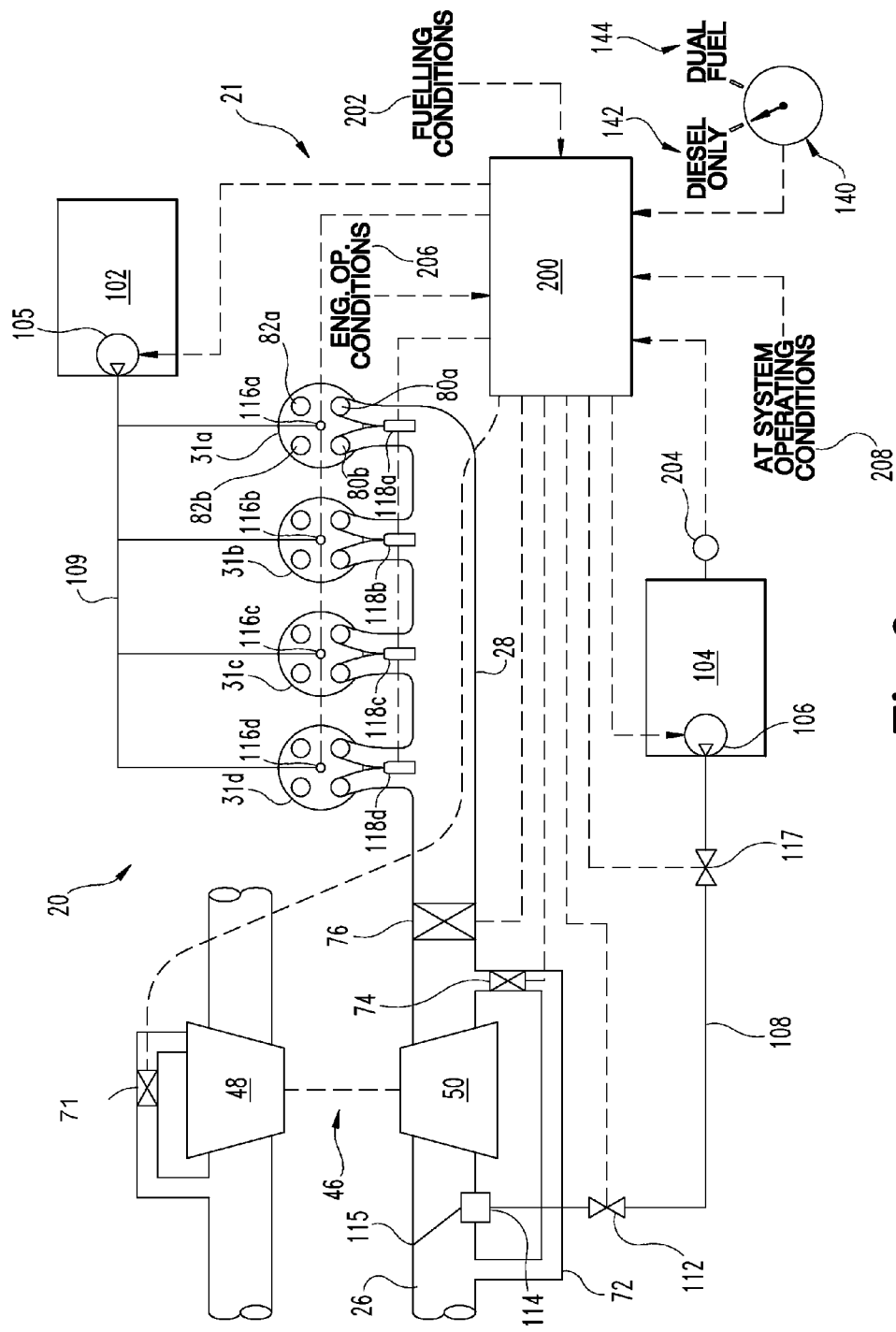
FIG. 2 is another schematic illustration of a part of the internal combustion engine system of FIG. 1 showing further embodiments of the dual fuel system.

With reference to FIGS. 1 and 2, an internal combustion engine system 20 is illustrated in schematic form. A fueling system 21 is also shown in schematic form that is operable with internal combustion engine system 20 to provide fueling for engine 30 from a first fuel source 102 and a second fuel source 104. Internal combustion engine system 20 includes engine 30 connected with an intake system 22 for providing a charge flow to engine 30 and an exhaust system 24 for output of exhaust gases. In certain embodiments, the engine 30 includes a lean combustion engine such as a diesel cycle engine that uses a primary fuel that is a liquid fuel such as diesel fuel and a secondary fuel that is a gaseous fuel such as natural gas. As used herein, gaseous fuel includes, but is not limited to, bio-gas, methane, propane, ethanol, producer gas, field gas, liquefied natural gas, compressed natural gas, or landfill gas. In the illustrated embodiment, the engine 30 includes six cylinders 31a-31f in an in-line arrangement. However, the number of cylinders (collectively referred to as cylinders 31) may be any number, and the arrangement of cylinders 31 may be any arrangement, and is not limited to the number and arrangement shown in FIG. 1.

Engine 30 includes an engine block 70 that at least partially defines the cylinders 31. A plurality of pistons (not shown) may be slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The engine 30 includes cylinders 31 connected to the intake system 22 to receive a charge flow and connected to exhaust system 24 to release exhaust gases produced by combustion of the primary and/or secondary fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are not provided. When provided, EGR system(s) 51, 60 provide exhaust gas recirculation to engine 30 in certain operating conditions. In any EGR arrangement during at least certain operating conditions, at least a portion the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to turbine 48 of turbocharger 46. Turbine 48 includes a valve such as controllable wastegate 71 or other suitable bypass that is operable to selectively bypass at least a portion of the exhaust flow from turbine 48 to reduce boost pressure and engine torque under certain operating conditions. In another embodiment, turbine 48 is a variable geometry turbine with a size-controllable inlet opening. In another embodiment, the exhaust valve is an exhaust throttle that can be closed or opened.

An aftertreatment system 90 can be connected with an exhaust outlet conduit 68. The aftertreatment system 90 may include, for example, one or more oxidation devices (DOC), particulate removing devices (DPF, CDPF), constituent absorbers or reducers (SCR, AMOX, LNT), reductant systems, and other components if desired.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26.

Compressor 50 receives fresh air flow from intake air supply conduit 23. Second fuel source 104 may also be flow coupled at or upstream of the inlet to compressor 50. Second fuel source 104 may also be connected to intake air supply conduit downstream of compressor 50. Intake system 22 further includes a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fuel system 21 is configured to provide dual fuelling of engine 30 from first and second fuel sources 102, 104 or fuelling from only first fuel source 102. First fuel source 102 is configured to provide a flow of a first fuel to cylinders 31 with one or more injectors at or near each cylinder 31. Second fuel source 104 is connected to intake system 22 with a mixer or connection at or adjacent an inlet of compressor 50. In certain embodiments, the cylinders 31 each include at least one direct injector for delivering fuel to the combustion chamber thereof from a primary fuel source, such as first fuel source 102. In addition, at least one of a port injector at each cylinder or a mixer at an inlet of compressor 50 can be provided for delivery or induction of fuel from the second fuel source 104 with the charge flow delivered to cylinders 31.

The fueling from the first fuel source 102 is controlled to provide the sole fueling at certain operating conditions of engine 30, and fueling from the second fuel source 104 is provided to substitute for fueling from the first fuel source 102 at other operating conditions to provide a dual flow of fuel to engine 30. In embodiments where the first fuel source 102 is diesel fuel and the second fuel source 104 is gaseous fuel such as natural gas, a control system including controller 200 is configured to control the flow of liquid diesel fuel from first source 102 and the flow of gaseous fuel from second source 104 in accordance with engine speed, engine loads, intake manifold pressures, and fuel pressures, for example. In addition, fuel system 21 includes a fuel source selector 140 that allows an operator or service technician to manually select a diesel fuel only fuelling mode 142 or a dual fuel fuelling mode 144. Fuel source selector 140 can be a discrete switch with two positions, an analog input device, or a datalink input that receives a fuel source selection from a communication device.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31, such as the illustrated cylinders 31a-d in FIG. 2 (cylinders 31e and 31f omitted for brevity, it being understood that any cylinder arrangement and number as discussed herein is contemplated) may include one or more direct injectors 116a-116d, respectively. The direct injectors 116a-116d may be the primary fueling device for first fuel source 102 for the cylinders 31a-31d.

A port injector, as utilized herein, includes any fuel injection device that injects fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31 may include one or more port injectors 118a-118d, respectively. In one embodiment, the port injectors 118a-118d may be the primary fueling device for second fuel source 104 to the cylinders 31a-31d. In another embodiment, the second fuel source 104 can be connected to intake system 22 with a mixer 115 at a natural gas connection 114 upstream of intake manifold 28, such as at the inlet of or upstream of compressor 50.

In certain embodiments, each cylinder 31 includes at least one direct injector that is capable of providing all of the designated primary fueling amount from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes. In certain conditions in which nominal operations of engine 30 call for fuelling from first fuel source 102 and second fuel source 104, an override of nominal conditions is provided by selecting a diesel only fuelling mode in response to an operator or service technician input or by the occurrence of an automatic override condition, as discussed further below.

One embodiment of system 20 includes fuel system 21 with at least one fuel source 102 to provide a primary fuel flow to all the cylinders 31 and a second fuel source 104 that provides a second fuel flow to all the cylinders 31 in addition to the primary fuel flow under certain operating conditions. First fuel source 102 includes a first fuel pump 105 that is connected to controller 200, and the second fuel source 104 includes, in one embodiment, a second fuel pump 106 that is connected to controller 200. Alternatively, second fuel source 104 is a source of pressurized gaseous fuel. Each of the cylinders 31 includes an injector, such as direct injectors 116a-116d associated with each of the illustrated cylinders 31a-31d of FIG. 2. Direct injectors 116a-116d are electrically connected with controller 200 to receive fueling commands that provide a fuel flow to the respective cylinder 31 in accordance with a fuel command determined according to engine operating conditions and operator demand by reference to fueling maps, control algorithms, or other fueling rate/ amount determination source stored in controller 200. First fuel pump 105 is connected to each of the direct injectors 116a-116d with a first fuel line 109. First fuel pump 105 is operable to provide a first fuel flow from first fuel source 102 to each of the cylinders 31a-31d in a rate, amount and timing determined by controller 200 that achieves a desired torque and exhaust output from cylinders 31.

Second fuel pump 106 is connected to the inlet of compressor 50 with natural gas connection 114 with a second fuel line 108 or is connected with a fuel line (not shown) connected to port injectors 118. A shutoff valve 112 can be provided in fuel line 108 and/or at one or more other locations in fuel system 21 that is connected to controller 200. Second fuel pump 106 is operable to provide a second fuel flow from second fuel source 104 in an amount determined by controller 200 that achieves a desired torque and exhaust output from cylinders 31. A flow control valve 117 can be provided to control the flow of gaseous fuel to engine 30 from second fuel source 104. In another embodiment, second fuel pump 106 is omitted and fuel is supplied to connection 114 or port injectors 118 under pressure from a pressurized second fuel source 104.

Controller 200 can be connected to actuators, switches, or other devices associated with fuel pumps 105, 106, shutoff valve 112, flow control valve 117, intake throttle 76, compressor bypass valve 74, wastegate 71 and/or injectors 116, 118 and configured to provide control commands thereto that regulate the amount, timing and duration of the flows of the first and second fuels to cylinders 31, the charge flow, and the exhaust flow to provide the desired torque and exhaust output. In addition, controller 200 can be connected to first fuel source 102, second fuel source 104, engine 30, and aftertreatment system 90 and configured to detect a dual fuel override condition in which a diesel only fuelling mode is automatically selected or selected by the operator or service technician to supply fuelling solely from first fuel source 102 in an amount, timing and duration that provides the desired torque and exhaust output. A dual fuel override conditions can be determined by, for example, a gaseous fuel gas supply deficiency, a gaseous fuel quality deficiency, an engine protection limit violation, and/or an aftertreatment system management requirement.

As discussed above, the positioning of each of shutoff valve 112, flow control valve 117, intake throttle 76, compressor bypass valve 74, wastegate 71 and/or injectors 116, 118 and the on/off status of fuel pumps 105, 106 can be controlled via control commands from controller 200. In addition controller 200 is configured to receive operating parameters such as first fuel source conditions 202, second fuel source conditions 204, engine operating conditions 206, and aftertreatment system operating conditions 208.

First fuel source conditions 202, as discussed further below, can include one or more of the commanded fuelling amount from first fuel source 102, the actual fuelling amount from first fuel source 102, the pressure, timing, and duration of the fuelling amount, and other parameters. Second fuel source conditions 204 can include one or more of the gas quality of second fuel source 104, the gas supply pressure of second fuel source 104, and the actual and commanded gas flow rates of second fuel source 104 in response to a fuelling command. Engine operating conditions 206 can include one or more of a torque request, engine speed, engine output torque, an intake manifold pressure, a fuel injector tip temperature, knock conditions, and any other engine temperature and/or pressure conditions. Aftertreatment system operating conditions 208 can include, for example, a urea deposit accumulation condition, a particulate matter accumulation condition, a sulfur deposit accumulation condition, and an aftertreatment component regeneration condition.

In certain embodiments of the systems disclosed herein, controller 200 is structured to perform certain operations to control engine operations and fuelling of cylinders 31 with fueling system 21 to provide the desired speed and torque outputs from first fuel source 102 only, or from both first and second fuel sources 102, 104. In certain embodiments, the controller 200 forms a portion of a processing subsystem including one or more computing devices having memory, processing, and communication hardware. The controller 200 may be a single device or a distributed device, and the functions of the controller 200 may be performed by hardware or software. The controller 200 may be included within, partially included within, or completely separated from an engine controller (not shown). The controller 200 is in communication with any sensor or actuator throughout the systems disclosed herein, including through direct communication, communication over a datalink, and/or through communication with other controllers or portions of the processing subsystem that provide sensor and/or actuator information to the controller 200. A sensor, as used herein, may be a physical sensor or a virtual sensor in which the operating condition or output is determined from one or more other sensors and operating parameters.

Certain operations described herein include operations to determine one or more parameters. Determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the parameter can be calculated, and/or by referencing a default value that is the parameter value.

Figure 3:
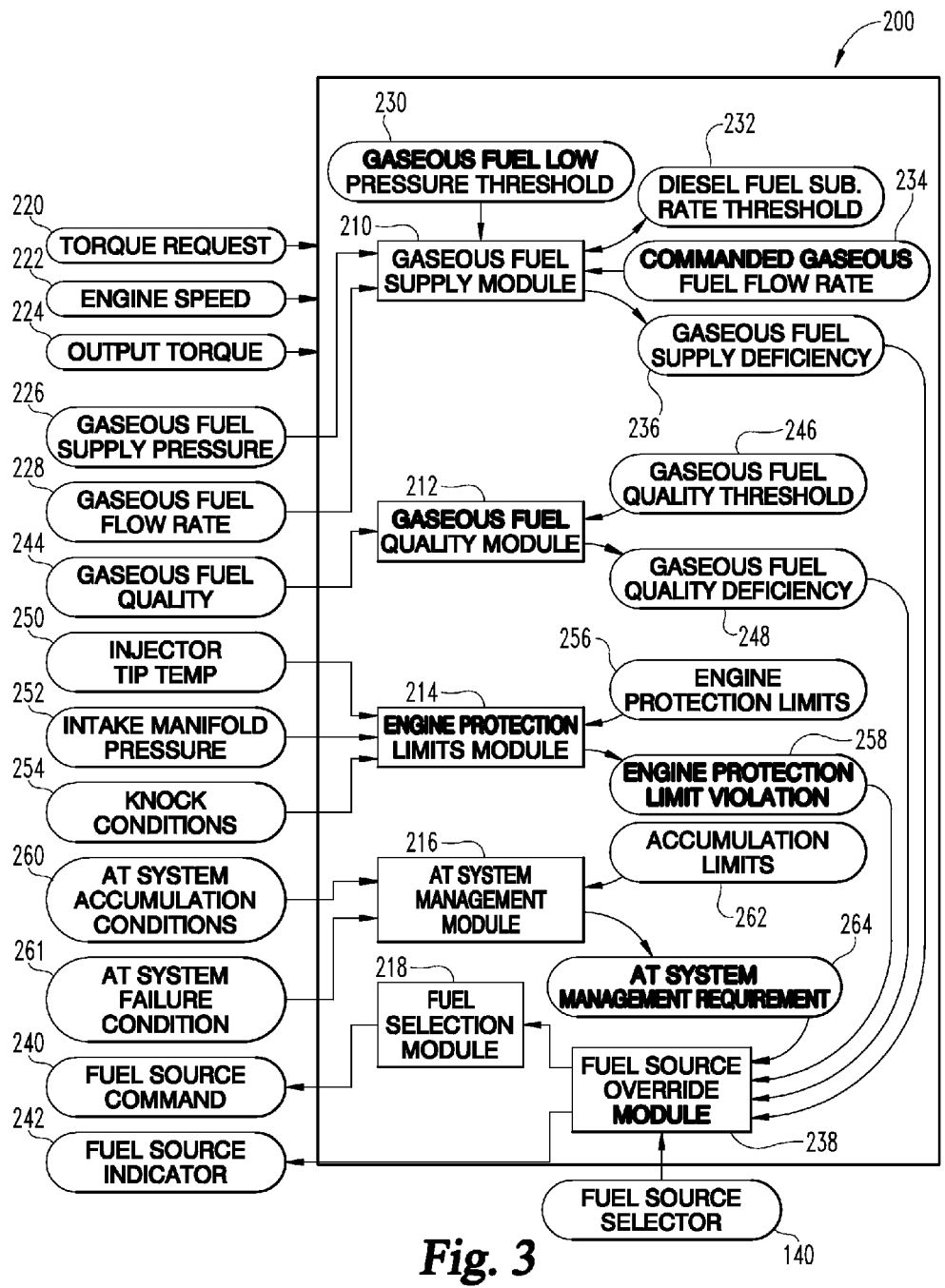
FIG. 3 is a schematic of a controller configured to control operation of a dual fuel engine.

Referring to FIG. 3, controller 200 includes a gaseous fuel supply module 210, a gaseous fuel quality module 212, an engine protection limit module 214, an aftertreatment (AT) system management module 216, and a fuel selection module 218. Controller 200 also receives inputs of various operating parameters associated with engine 30. For example, controller 200 can receive inputs of an operator torque request 220 from, for example, an accelerator position alone or in combination with other load requesting devices connected to the engine 30. Controller 200 can also receive an engine speed input 222 from, for example, an engine speed sensor, and an engine output torque input 224 from, for example, cylinder pressure measurements or output torque of a crankshaft.

Gaseous fuel supply module 210 further receives an input of a gaseous fuel supply pressure 226 and an input of a gaseous fuel flow rate 228. Gaseous fuel supply module 210 also receives or determines a gaseous fuel low pressure threshold 230, a diesel fuel substitution rate upper threshold 232, and a commanded gaseous fuel flow rate 234. Gaseous fuel supply module 210 is further configured to determine a gaseous fuel supply deficiency 236 in response to a gaseous fuel supply deviation condition. A gaseous fuel supply deviation condition can be determined in response to gaseous fuel supply pressure 226 being less than a gaseous fuel low pressure threshold 230, indicating that the supply pressure of the gaseous fuel is not capable of satisfying operating requirements for fuelling with gaseous fuel. A gaseous fuel supply deviation condition can be determined in response to gaseous fuel flow rate 228 being less than a commanded gaseous fuel flow rate 234 by more than a threshold amount, indicating that the available flow rate of the gaseous fuel supply is not capable of satisfying operating requirements for fuelling with gaseous fuel. A gaseous fuel supply deviation condition can also be determined if the actual substitution rate of diesel fuel exceeds the diesel fuel substitution rate threshold 232, indicating that the gaseous fuel supply is not capable of satisfying operating requirements for substitution of gaseous fuel for diesel fuel.

The gaseous fuel supply deficiency 236 can be provided as an input to fuel source override module 238. The fuel source override module 238 indicates that override of dual fuelling operation is required or desired and, in one embodiment, provides an override indication to fuel source selection module 218. Fuel source selection module 218 can be configured to automatically override the dual fuelling mode of operation with a fuel source command 240 that provides fuelling to engine 30 only from first fuel source 102. In one embodiment, fuel selection module 218 provides a fuel source indicator 242 to, for example, the operator or service technician, indicating that fuelling is being provided from first fuel source 102 only in a diesel only fuelling mode. In a further embodiment, the fuel source indicator 242 can be provided from fuel source override module 238 without an automatic override of the dual fuelling mode of operation, and the override occurs by fuel source indicator 242 prompting the operator or service technician to select a diesel only fuelling mode of operation through fuelling source selector 140 providing a diesel only fuelling mode selection 142 to fuel selection module 218.

Gaseous fuel quality module 212 further receives an input of a gaseous fuel quality 244 from, for example, one or more sensors or operating conditions that provide an indication of the quality of the gaseous fuel from second fuel source 104. Any suitable indicator of gaseous fuel quality can be provided, such as a heating value, a combustion parameter, a composition value, the absence, presence or amount of one or more constituents, or any other indicator of quality. Gaseous quality module 212 also receives or determines a gaseous fuel quality threshold 246, and is further configured to determine a gaseous fuel quality deficiency 248 in response to a gaseous fuel quality deviation condition when the quality of the gaseous fuel is less than the quality threshold 246, indicating that the gaseous fuel is not of sufficient quality to satisfy operating requirements for dual fuel operation. The gaseous fuel quality deficiency 248 can be provided as an input to fuel source override module 238, which provides an output to prompt selection of a diesel fuelling only mode of operation, or directs fuel selection module 218 to automatically select a diesel only fuelling mode. Fuel selection module 218 outputs a fuel source command 240 that provides fuelling to engine 30 from first fuel source 102 only and an indicator 242 that fuelling is being provided from first fuel source only. Alternatively, fuel selection module 218 awaits an input from fuel source selector 140 in response to an output from fuel source indicator 242 indicating a diesel only fuelling mode, or waits a period of time for the operator or service technician to take another action, before switching to a diesel only fuelling mode.

Engine protection limit module 214 receives inputs of engine operating conditions, such as injector tip temperature 250, intake manifold pressure 252, and knock conditions 254. Engine protection limit module 214 further receives or interprets engine protection limits 256 for one or more of these operating conditions, and outputs an engine protection limit violation 258 in response to one or more of these conditions exceeding the protection limits 256. Engine protection limit violation 258 is received by fuel source override module 238, which can provide an output to fuel source indicator 242 indicating that selection of a diesel only fuelling mode is desirable, and/or an output to fuel selection module 218 to select a diesel only fuelling mode of operation with fuel source command 240, either automatically or in response to fuel source selector 140.

AT system management module 216 receives inputs of AT system operating conditions, such as AT system accumulation conditions 260. AT system management module 218 can also receive inputs such as an AT system failure condition 261. For example, condition 261 can include an oxidation catalyst failure to recover from a low or no non-methane hydrocarbon (NHMC) conversion condition, indicating an oxidation catalyst failure. AT system management module 218 may further receive or interpret AT system accumulation limits 262 for one or more of these accumulation conditions 260, and outputs an AT system management requirement 264 in response to one or more of these conditions 260 exceeding the accumulation limits 262 or in response to an AT system failure condition 261. AT system management requirement 264 is received by fuel source override module 238, which can provide an output to fuel source indicator 242 indicating that selection of a diesel only fuelling mode is desirable, and/or an output to fuel selection module 218 to select a diesel only fuelling mode of operation with fuel source command 240.

The schematic flow description which follows provides an illustrative embodiment of a method for selection of a diesel only fuelling mode of operation in a dual fuel internal combustion engine system 20. Operations illustrated are understood to be exemplary only, and operations may be combined or divided, and added or removed, as well as re-ordered in whole or part, unless stated explicitly to the contrary herein. Certain operations illustrated may be implemented by a computer such as controller 200 executing a computer program product on a non-transient computer readable storage medium, where the computer program product comprises instructions causing the computer to execute one or more of the operations, or to issue commands to other devices to execute one or more of the operations.

Figure 4:
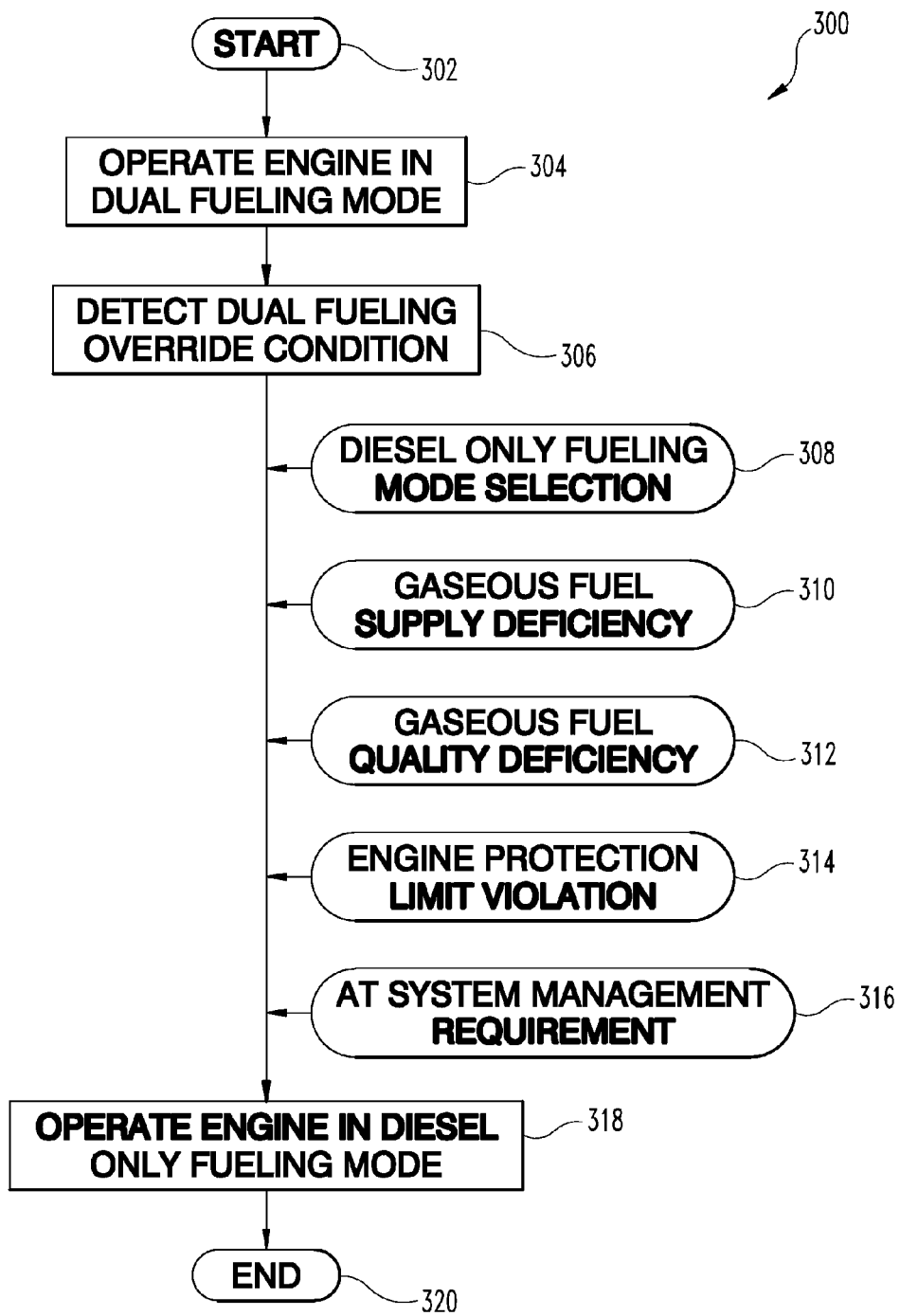
FIG. 4 is a flow diagram of a procedure for controlling operation of a dual fuel engine.

In FIG. 4, one embodiment of a flow diagram for operating engine 30 with dual fuel system 21 is disclosed. Procedure 300 starts at 302 upon, for example, starting of engine 30. At operation 304 the engine 30 is operated in a dual fuel mode of operation in which fuel is provided from first fuel source 102 and second fuel source 104. Procedure 300 continues at operation 306 to detect a dual fuelling mode override condition. The dual fuelling mode override condition can be detected in response to a diesel only fuelling mode selection 308 from, for example, fuel selector device 140. The dual fuel override condition can also be selected in response to, for example, a gaseous fuel supply deficiency 310, a gaseous fuel quality deficiency 312, an engine protection limit violation 314, and/or an aftertreatment system management requirement 316. Upon detection of dual fuelling override condition, procedure 300 continues at operation 318 to operate engine 30 in a diesel only fuelling mode at operation 318. Procedure 300 ends at 320, or returns to operation 304 when engine 30 is operated in a dual fuelling mode of operation.

Various aspects of the systems and methods disclosed herein are contemplated. For example, one aspect relates to a method that includes operating an internal combustion engine system that includes an intake connected to an engine with at least one cylinder and at least two fuel sources operably connected to the engine to provide a diesel fuel and a gaseous fuel to the at least one cylinder to produce a torque output in a dual fuel mode of operation. The intake is coupled to the at least one cylinder to provide a charge flow from the intake to the at least one cylinder, and the internal combustion engine system further includes an exhaust with an aftertreatment system connected to the at least one cylinder. The method includes selecting a diesel only fuelling mode of operation of the engine in response to a dual fuel override condition occurring during the dual fuel mode of operation resulting from an input to a fuel source selector, a determination of at least one of a gaseous fuel supply deficiency associated with the gaseous fuel, a determination of a gaseous fuel quality deficiency associated with the gaseous fuel, an engine protection limit violation associated with the engine, and a determination of an aftertreatment system management requirement associated with the aftertreatment system. The method also includes operating the internal combustion engine by providing diesel fuel only to the at least one cylinder in response to selecting the diesel only fuelling mode.

In one embodiment, the at least one cylinder includes a plurality of cylinders. In another embodiment, selecting the diesel only fuelling mode of operation includes receiving an input from at least one of a discrete switch, an analog input, and a datalink input.

In another embodiment, the gaseous fuel supply deficiency includes at least one of a gaseous fuel supply pressure being less than a low pressure threshold, an actual gaseous fuel flow rate being less than a commanded gaseous fuel flow rate by more than a threshold amount, and a diesel fuel substitution rate exceeding an upper threshold amount to satisfy a torque output request at the commanded gaseous fuel flow for the torque output request. In yet another embodiment, the gaseous fuel quality deficiency includes a quality of the gaseous fuel being less than a gaseous fuel quality threshold.

In another embodiment, the engine protection limit violation includes at least one of a fuel injector tip exceeding a high temperature limit, an engine knock amount exceeding a knock limit, a combustion misfire condition, and an intake manifold pressure exceeding an upper pressure limit. In a refinement of this embodiment, the intake manifold pressure upper pressure limit is exceeded in response to at least one of a backfire condition, a high pressure condition of the gaseous fuel in the intake, a failure of a gaseous fuel supply control valve, and a failure of the gaseous fuel supply control system.

In another embodiment, the aftertreatment component management requirement is determined in response to at least one of a urea accumulation, a sulfur accumulation, a particulate accumulation, and a soot accumulation in the exhaust system exceeding an accumulation limit.

In accordance with another aspect, a system includes an internal combustion engine including a plurality of cylinders, an exhaust system configured to receive exhaust from the plurality of cylinders that includes at least one aftertreatment component, and an intake system configured to direct a charge flow to the plurality of cylinders and a compressor for compressing the charge flow. The system also includes a fuel system with a first fuel source operable to provide a liquid fuel to the plurality of cylinders and a second fuel source operable to provide a gaseous fuel upstream of the cylinders in the charge flow in addition to the liquid fuel in a dual fuel mode of operation. The system also includes a controller connected to a plurality of sensors associated with the engine, the at least one aftertreatment component, the first fuel source, and the second fuel source. The controller is configured to determine a dual fuel override condition in response to at least one of an input to a fuel source selector, a gaseous fuel supply deficiency, a gaseous fuel quality deficiency, an engine protection limit violation, and an aftertreatment system management requirement. The controller is further configured to control the first fuel source and the second fuel source so that only liquid fuel is provided for operation of the engine in response to the dual fuel override condition.

In one embodiment, the liquid fuel is diesel fuel and the gaseous fuel is natural gas. In another embodiment, the fuel source selector is in communication with the controller that is manipulatable to select a first fuelling mode where fuelling to the engine is provided only from the first fuel source and a second fuelling mode where fuelling is provided in the dual fuel mode of operation. In another embodiment, the system includes a fuel source indicator operable to indicate the dual fuel override condition. In another embodiment, the controller is configured automatically control the first fuel source and the second fuel source so that only liquid fuel is provided for operation of the engine in response to the dual fuel override condition.

In a further embodiment of the system, the plurality of sensors include a pressure sensor operable to provide an output indicating a pressure of the gaseous fuel at the second fuel source, a flow sensor operable to provide an output indicating a flow rate of the gaseous fuel to the engine, and a first fuel source sensor operable to provide an output indicating a substitution rate of the first fuel for the second fuel in the dual fuel mode of operation. The controller is configured to determine the gaseous fuel supply deficiency in response to at least one of the pressure of the gaseous fuel being less than a low pressure threshold, the fuel flow rate of the gaseous fuel being less than a commanded gaseous fuel flow rate by more than a threshold amount, and the substitution rate of the first fuel exceeding an upper threshold amount to satisfy a torque request at the commanded gaseous fuel flow rate for the torque request.

In another embodiment of the system, the plurality of sensors include a quality sensor operable to provide an output indicating a quality of the gaseous fuel of the second fuel source and the controller is configured to determine the gaseous fuel quality deficiency in response to the quality of the gaseous fuel being less than a gaseous fuel quality threshold.

In another embodiment of the system, the plurality of sensors include a temperature sensor operable to provide an output indicating a temperature of fuel injectors connected with the plurality of cylinders, a pressure sensor operable to provide an output indicating a pressure of an intake manifold of the intake system, and a knock sensor operable to provide an output of a knock condition of the engine. The controller is configured to determine the engine protection limit violation in response to at least one of the temperature of the fuel injectors exceeding a high temperature limit, the knock condition of the engine exceeding a knock limit, and the pressure of the intake manifold exceeding an upper pressure limit.

In another embodiment of the system, the plurality of sensors include at least one sensor associated with the at least one aftertreatment component operable to provide an output indicating an accumulation condition of the at least one aftertreatment component. The controller is configured to determine the aftertreatment component management requirement in response to at least one of the accumulation condition exceeding an accumulation limit and a failure condition of an aftertreatment system component.

According to yet another aspect, an apparatus includes a controller connected to a plurality of sensors associated with an internal combustion engine system. The internal combustion engine system includes an intake, an engine, an aftertreatment system, a first fuel source operable to provide a diesel fuel to the engine, and a second fuel source operable to provide a gaseous fuel to the engine in addition to the diesel fuel in a dual fuel mode of operation. The controller includes a fuel source override module configured to determine a dual fuel override condition in response at least one of an input to a fuel source selector, a gaseous fuel supply deficiency associated with the gaseous fuel, a gaseous fuel quality deficiency associated with the gaseous fuel, an engine protection limit violation associated with the engine, and an aftertreatment system management requirement associated with the aftertreatment system. The controller also includes a fuel selection module configured to provide a diesel only fuelling command that provides fuelling only from the first fuel source while prohibiting fuelling from the second fuel source in response to the dual fuel override condition.

In one embodiment, the fuel source override module is configured to provide an output of the dual fuel override condition to a fuel source indicator, and the fuel selection module is configured to provide the diesel only fuelling command in response to the input from the fuel source selector.

In another embodiment, the controller includes a gaseous fuel supply module configured to determine the gaseous fuel supply deficiency in response to at least one of a supply pressure of the gaseous fuel being less than a low pressure threshold, a flow rate of the gaseous fuel being less than a commanded flow rate by more than a threshold amount, and a diesel fuel substitution rate exceeding an upper threshold amount to satisfy a torque output request at the commanded gaseous fuel flow for the torque output request. The controller also includes a gaseous fuel quality module configured to determine the gaseous fuel quality deficiency in response to a quality of the gaseous fuel being less than a gaseous fuel quality threshold, an engine protection limit module configured to determine the engine protection limit violation in response to one or more operating conditions of the engine exceeding a protection limit, and an aftertreatment system management module configured to determine the aftertreatment system management requirement in response to at least one of a failure of an aftertreatment system component and an accumulation condition of the aftertreatment system exceeding an accumulation limit for at least one of urea, sulfur, particulates and soot.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an internal combustion engine system including an intake connected to an engine with at least one cylinder and at least two fuel sources operably connected to the engine to provide a diesel fuel and a gaseous fuel to the at least one cylinder to produce a torque output in a dual fuel mode of operation, wherein the intake is coupled to the at least one cylinder to provide a charge flow from the intake to the at least one cylinder, the internal combustion engine system further including an exhaust with an aftertreatment system connected to the at least one cylinder;
    operating the engine in a diesel only fuelling mode of operation of the engine in response to a dual fuel override condition occurring during the dual fuel mode of operation resulting from at least one of a selection of a diesel only mode from a fuel source selector, a determination of a gaseous fuel supply deficiency associated with the gaseous fuel, a determination of a gaseous fuel quality deficiency associated with the gaseous fuel, a determination of an engine protection limit violation associated with the engine, and a determination of an aftertreatment system management requirement associated with the aftertreatment system, wherein the gaseous fuel supply deficiency includes at least one of a gaseous fuel supply pressure being less than a low pressure threshold, an actual gaseous fuel flow rate being less than a commanded gaseous fuel flow rate by more than a threshold amount, and a diesel fuel substitution rate exceeding an upper threshold amount to satisfy a torque output request at the commanded gaseous fuel flow for the torque output request; and
    operating the internal combustion engine by providing diesel fuel only to the at least one cylinder in response to selecting the diesel only fuelling mode.

2. The method of claim 1, wherein the at least one cylinder includes a plurality of cylinders.

3. The method of claim 1, wherein the selection of the diesel only mode from the fuel source selector includes receiving an input from at least one of a discrete switch, an analog input, and a datalink input.

4. The method of claim 1, wherein the gaseous fuel quality deficiency includes a quality of the gaseous fuel being less than a gaseous fuel quality threshold.

5. A method, comprising:
    operating an internal combustion engine system including an intake connected to an engine with at least one cylinder and at least two fuel sources operably connected to the engine to provide a diesel fuel and a gaseous fuel to the at least one cylinder to produce a toque output in a dual fuel mode of operation, wherein the intake is coupled to the at least one cylinder to provide a charge flow from the intake to the at least one cylinder, the internal combustion engine system further including an exhaust with an aftertreatment system connected to the at least one cylinder;
    operating the engine in a diesel only fuelling mode of operation of the engine in response to a duel fuel override condition occurring during the dual fuel mode of operation resulting from a determination of an engine protection limit violation associated with the engine, wherein the engine protection limit violation includes at least one of a fuel injector tip exceeding a high temperature limit, an engine knock amount exceeding a knock limit, a combustion misfire condition, and an intake manifold pressure exceeding an upper pressure limit; and
    operating the internal combustion engine by providing diesel fuel only to the at least one cylinder in response to selecting the diesel only fuelling mode.

6. The method of claim 5, wherein the intake manifold pressure upper pressure limit is exceeded in response to at least one of a backfire condition, a high pressure condition of the gaseous fuel in the intake, a failure of a gaseous fuel supply control valve, and a failure of the gaseous fuel supply control system.

7. A method, comprising:
    operating an in internal combustion engine system including an intake connected to an engine with at least one cylinder and at least two fuel sources operably connected to the engine to provide a diesel fuel and a gaseous fuel to the at least one cylinder to produce a torque output in a dual fuel mode of operation, wherein the intake is coupled to the at least one cylinder to provide a charge flow from the intake to the at least one cylinder, the internal combustion engine system further including an exhaust with an aftertreatment system connected to the at least one cylinder;
    operating the engine in a diesel only fuelling mode of operation of the engine in response to a dual fuel override condition occurring during the deal fuel mode of operation resulting from a determination of an aftertreatment system management requirement associated with the aftertreatment system, wherein the aftertreatment component management requirement is determined in response to one of a failure condition of an aftertreatment system component or at least one of a urea accumulation, a sulfur accumulation, a particulate accumulation, and a soot accumulation in the exhaust system exceeding an accumulation limit; and
    operating the internal combustion engine by providing diesel fuel only to the at least one cylinder in response to selecting the diesel only fueling mode.

8. A system, comprising:
    an internal combustion engine including a plurality of cylinders;
    an exhaust system configured to receive exhaust from the plurality of cylinders, the exhaust system including at least one aftertreatment component;

an intake system configured to direct a charge flow to the plurality of cylinders, wherein the intake system includes a compressor for compressing the charge flow;

a fuel system including a first fuel source operable to provide a liquid fuel to the plurality of cylinders and a second fuel source operable to provide a gaseous fuel upstream of the cylinders in the charge flow in addition to the liquid fuel in a dual fuel mode of operation; and a controller connected to a plurality of sensors associated with the engine, the at least one aftertreatment component, the first fuel source, and the second fuel source, the plurality of sensors including pressure sensor operable to provide an output indicating a pressure of the gaseous fuel at the second fuel source, a flow sensor operable to provide an output indicating a flow rate of the gaseous fuel to the engine, and a first fuel source sensor operable to provide an output indicating a substitution rate of the first fuel for the second fuel in the dual fuel mode of operation, wherein the controller is configured to determine a dual fuel override condition in response to at least one of an input to a fuel source selector, a gaseous fuel supply deficiency, a gaseous fuel quality deficiency, an engine protection limit violation, and an aftertreatment system management requirement, wherein the controller is further configured to determine the gaseous fuel supply deficiency in response to at least one of the pressure of the gaseous fuel being less than a low pressure threshold, the fuel flow rate of the gaseous fuel being less than a commanded gaseous fuel flow rate by more than a threshold amount, and the substitution rate of the first fuel exceeding an upper threshold amount to satisfy a torque request at the commanded gaseous fuel flow rate for the torque request and to control the first fuel source and the second fuel source so that only liquid fuel is provided for operation of the engine in response to the dual fuel override condition.

9. The system of claim 8, wherein the liquid fuel is diesel fuel and the gaseous fuel is natural gas.

10. The system of claim 8, where the fuel source selector is in communication with the controller, wherein the fuel source selector is manipulatable to select a first fuelling mode where fuelling to the engine is provided only from the first fuel source and a second fuelling mode where fuelling is provided in the dual fuel mode of operation.

11. The system of claim 10, further comprising a fuel source indicator operable to indicate the dual fuel override condition.

12. The system of claim 8, wherein the controller is configured automatically control the first fuel source and the second fuel source so that only liquid fuel is provided for operation of the engine in response to the dual fuel override condition.

13. A system, comprising:
an internal combustion engine including a plurality of cylinders;
an exhaust system configured to receive exhaust from the plurality of cylinders, the exhaust system including at least one aftertreatment component;
an intake system configured to direct a charge flow to the plurality of cylinders, wherein the intake system includes a compressor for compressing the charge flow;
a fuel system including a first fuel source operable to provide a liquid fuel to the plurality of cylinders and a second fuel source operable to provide a gaseous fuel upstream of the cylinders in the charge flow in addition to the liquid fuel in a dual fuel mode of operation; and
a controller connected to a plurality of sensors associated with the engine, the at least one aftertreatment component, the first fuel source, and the second fuel source, the plurality of sensors include a quality sensor operable to provide an output indicating a quality of the gaseous fuel of the second fuel source, wherein the controller is configured to determine a dual fuel override condition in response to a gaseous fuel quality deficiency, wherein the controller is further configured to determine the gaseous fuel quality deficiency in response to the quality of the gaseous fuel being less than a gaseous fuel quality threshold and control the first fuel source and the second fuel source so that only liquid fuel is provided for operation of the engine in response to the dual fuel override condition.

14. A system, comprising:
an internal combustion engine including plurality of cylinders;
an exhaust system configured to receive exhaust from the plurality of cylinders, the exhaust system including at least one aftertreatment component;
an intake system configured to direct a charge flow to the plurality of cylinders, wherein the intake system includes a compressor for compressing the charge flow;
a fuel system including a first fuel source operable to provide a liquid fuel to the plurality of cylinders and a second fuel source operable to provide a gaseous fuel upstream of the cylinders in the charge flow in addition to the liquid fuel in a dual fuel mode of operation; and
a controller connected to a plurality of sensors associated with the engine, the at least one aftertreatment component, the first fuel source, and the second fuel source, the plurality of sensors include a temperature sensor operable to provide an output indicating a temperature of fuel injectors connected with the plurality of cylinders, a pressure sensor operable to provide an output indicating a pressure of an intake manifold of the intake system, and a knock sensor operable to provide an output of a knock condition of the engine; and
the controller is configured to determine a dual fuel override condition in response to an engine protection limit violation, wherein the controller is further configured to determine the engine protection limit violation in response to at least one of the temperature of the fuel injectors exceeding a high temperature limit, the knock condition of the engine exceeding a knock limit, and the pressure of the intake manifold exceeding an upper pressure limit and control the first fuel source and the second fuel source so that only liquid fuel is provided for operation of the engine in response to the dual fuel override condition.

15. A system, comprising:
an internal combustion engine including a plurality of cylinders;
an exhaust system configured to receive exhaust from the plurality of cylinders, the exhaust system including at least one aftertreatment component;
an intake system configured to direct a charge flow to the plurality of cylinders, wherein the intake system includes a compressor for compressing the charge flow;
a fuel system including a first fuel source operable to provide a liquid fuel to the plurality of cylinders and a second fuel source operable to provide a gaseous fuel upstream of the cylinders in the charge flow in addition to the liquid fuel in a dual fuel mode of operation; and
a controller connected to a plurality of sensors associated with the engine, the at least one aftertreatment component, the first fuel source, and the second fuel source, the plurality of sensors include at least one sensor associated with the at least one aftertreatment component operable to provide an output indicating an accumulation condition of the at least one aftertreatment component; and the controller is configured to determine a dual fuel override condition in response to an aftertreatment component management requirement, wherein the controller is further configured to determine the aftertreatment component management requirement in response to at least one of an aftertreatment component failure condition and the accumulation condition exceeding an accumulation limit and control the first fuel source and the second fuel source so that only liquid fuel is provided for operation of the engine in response to the duel fuel override condition.

16. An apparatus, comprising:

a controller connected to a plurality of sensors associated with an internal combustion engine system, the internal combustion engine system including an intake, an engine, and an aftertreatment system, the internal combustion engine system further including a first fuel source operable to provide a diesel fuel to the engine and a second fuel source operable to provide a gaseous fuel to the engine in addition to the diesel fuel in a dual fuel mode of operation, wherein the controller includes:

a fuel source override module configured, responsive to the sensors, to determine a dual fuel override condition in response to an actual gaseous fuel flow rate being less tan a commanded gaseous fuel flow rate by more than a threshold amount, a diesel fuel substitution rate exceeding an upper threshold amount to satisfy a torque output request at the commanded gaseous fuel flow for the torque output request, a gaseous fuel quality deficiency associated with the gaseous fuel, an engine protection limit violation associated with the engine, and an aftertreatment system management requirement associated with the aftertreatment system; and a fuel selection module configured, responsive to a determination of the dual fuel override condition by the fuel source override module, to provide a diesel only fuelling command that provides fuelling only from the first fuel source while prohibiting fuelling from the second fuel source in response to the dual fuel override condition.

17. The apparatus of claim 16, wherein the fuel source override module is configured to provide an output of the dual fuel override condition to a fuel source indicator.

18. The apparatus of claim 16, wherein the controller includes:

a gaseous fuel supply module configured to determine the flow rate of the gaseous fuel being less than the commanded flow rate by more than the threshold amount, and the diesel fuel substitution rate exceeding the upper threshold amount to satisfy the torque output request at the commanded gaseous fuel flow for the torque output request;

a gaseous fuel quality module configured to determine the gaseous fuel quality deficiency in response to a quality of the gaseous fuel being less than a gaseous fuel quality threshold;

an engine protection limit module configured to determine the engine protection limit violation in response to one or more operating conditions of the engine exceeding a protection limit; and an aftertreatment system management module configured to determine the aftertreatment system management requirement in response to at least one of a failure condition of an aftertreatment component and an accumulation condition of the aftertreatment system exceeding an accumulation limit for at least one of urea, sulfur, particulates and soot.

* * * * *